US005669107A

United States Patent [19]
Carlsen et al.

[11] Patent Number: 5,669,107
[45] Date of Patent: Sep. 23, 1997

[54] FRICTION DETENT APPARATUS FOR SEAT ACCESSORY

[75] Inventors: Patrick J. Carlsen, St. Clair Shores; Daniel E. Hawkins, Milford, both of Mich.

[73] Assignee: Lear Corporation, Southfield, Mich.

[21] Appl. No.: 682,943

[22] Filed: Jul. 16, 1996

[51] Int. Cl.$^6$ .................................................. E05D 11/10
[52] U.S. Cl. .......................... 16/348; 16/357; 16/325; 297/411.32
[58] Field of Search .................. 16/348, 357, 360, 16/361, 324, 325, 326, 327; 297/112, 113, 115, 117, 411.25, 411.32, 411.38, 411.39, 354.11, 378.1, 378.11; 108/1, 6; 220/331; 248/118, 118.1, 118.3, 118.5

[56] References Cited

U.S. PATENT DOCUMENTS

| | | | |
|---|---|---|---|
| 2,233,882 | 3/1941 | Bobek | 16/348 |
| 3,038,196 | 6/1962 | Nyquist | 16/358 |
| 3,359,028 | 12/1967 | Seckerson | 16/348 |
| 3,359,029 | 12/1967 | Fernberg | 16/348 |
| 3,807,799 | 4/1974 | Freeman. | |
| 4,082,352 | 4/1978 | Bales et al. | 16/325 |
| 4,485,524 | 12/1984 | Neville | 16/361 |
| 4,734,955 | 4/1988 | Connor. | |
| 4,848,840 | 7/1989 | Toya. | |
| 4,848,873 | 7/1989 | Villar | 16/348 |
| 4,882,807 | 11/1989 | Frye et al.. | |
| 4,953,259 | 9/1990 | Frye et al.. | |
| 5,172,969 | 12/1992 | Reuter et al. | 16/358 |

FOREIGN PATENT DOCUMENTS 1369254  6/1964  France ............................ 16/348

*Primary Examiner*—Chuck Y. Mah
*Attorney, Agent, or Firm*—Howard & Howard

[57] ABSTRACT

A friction detent apparatus includes a resistance washer having a planar circular body with a central portion fixedly mounted to a pivot rod attached to a support structure, the body having a first arcuate friction contact surface spaced a first predetermined distance from the central portion and a second arcuate friction contact surface spaced a second greater predetermined distance from the central portion, a first detent nub formed on the first contact surface and a second detent nub formed on the second contact surface. First and second follower pins are fixedly mounted on a device pivotally mounted on the pivot rod for engaging the first and second friction surfaces respectively. The pins move along the friction surfaces as the device is rotated relative to the pivot rod and the detent nubs releasably retain the pins in an "end of travel" position. In a tension beam washer form, an elongated arcuate slot in the body has the first friction surface as a side thereof and a portion of the body is deflected outwardly under tension as the first pin moves past the first detent nub. In a compression beam washer form, the first friction surface is formed as a radially recessed portion of a periphery of the body, an arcuate slot is formed in the body and the portion of the body adjacent the slot is deflected inwardly under compression as the first pin moves past the first detent nub.

20 Claims, 4 Drawing Sheets

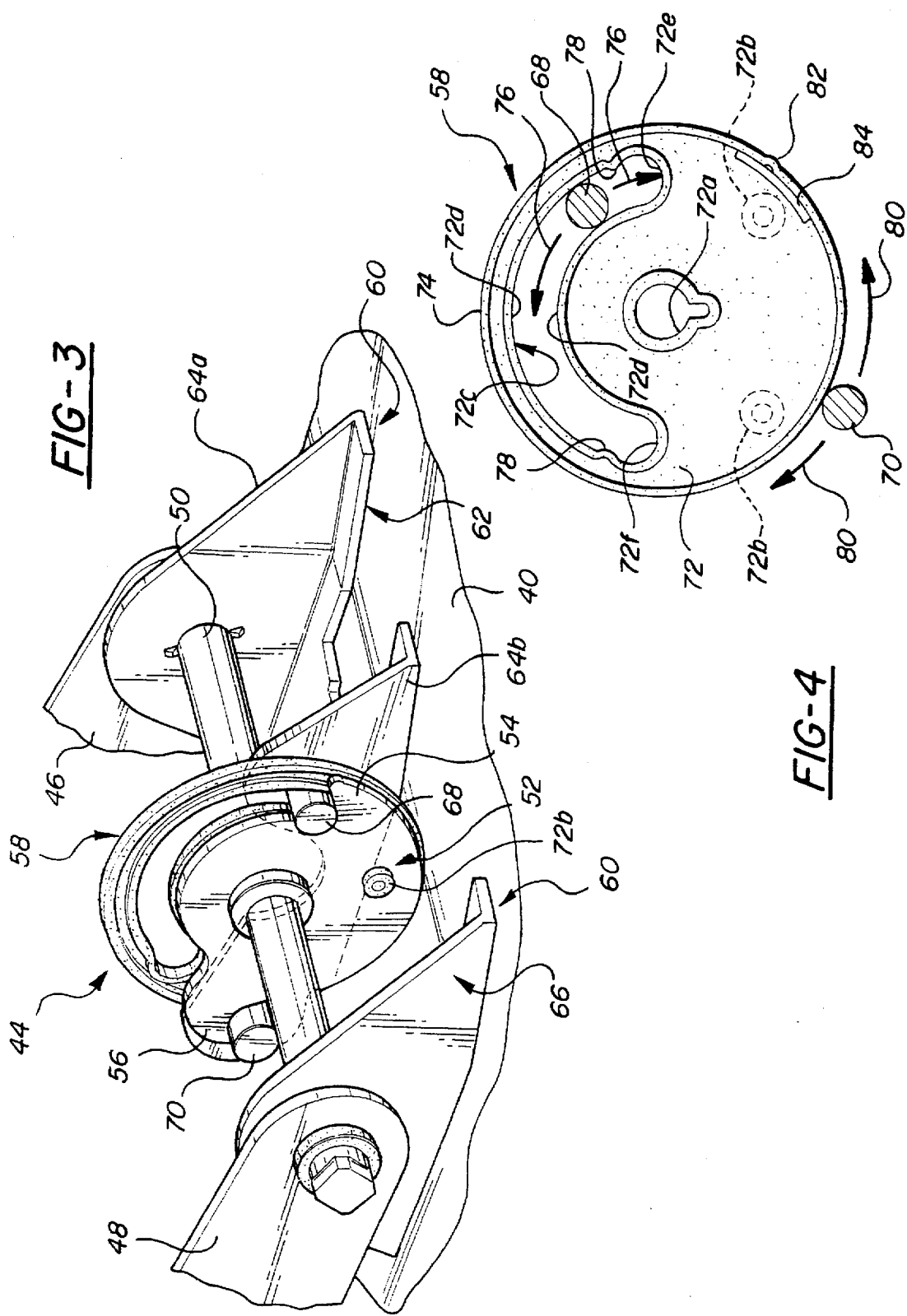

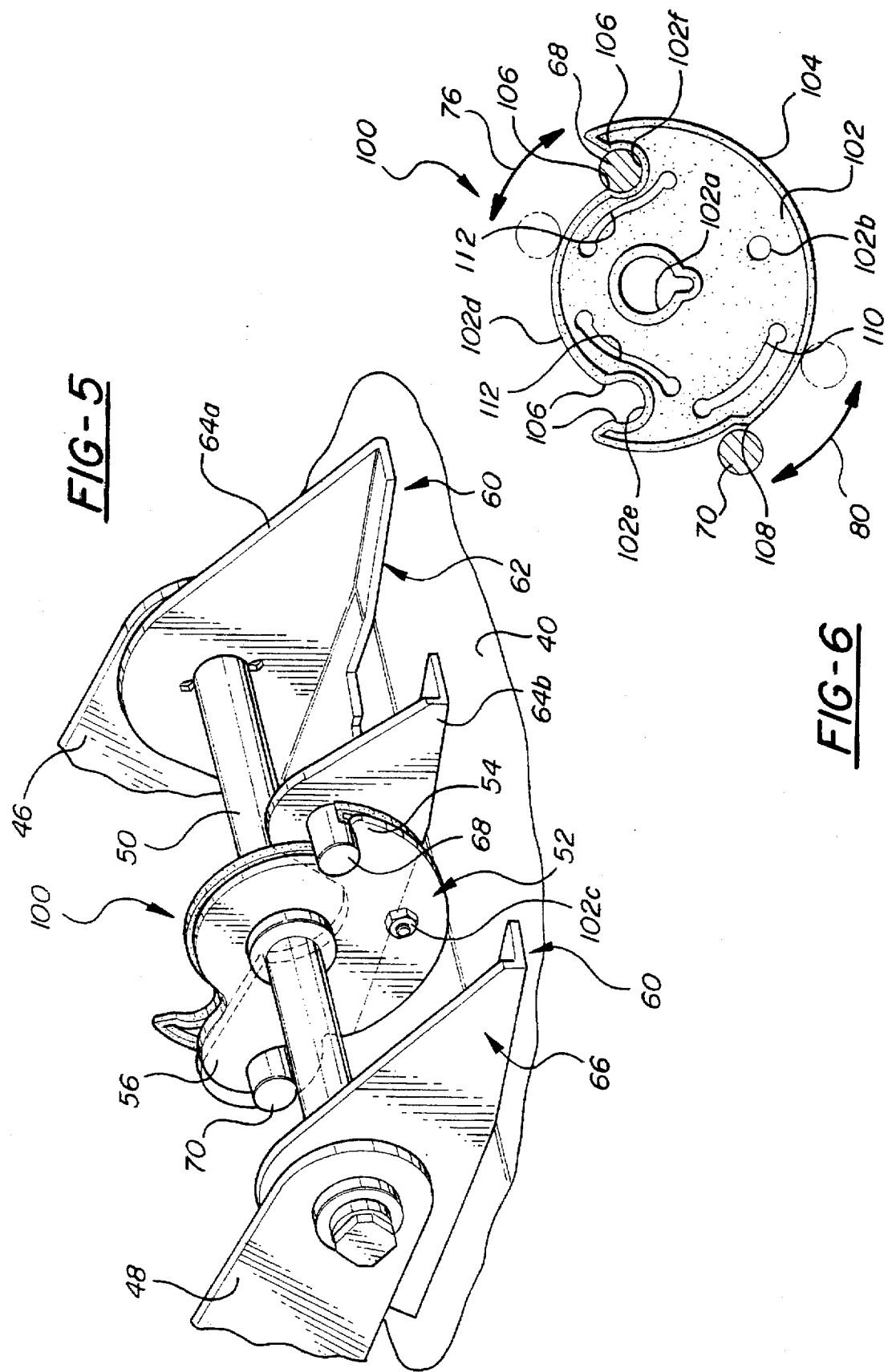

FRICTION DETENT APPARATUS FOR SEAT ACCESSORY

BACKGROUND OF THE INVENTION

1. Field of the Invention

The present invention relates generally to an apparatus for controlling pivotal movement and, in particular, to an apparatus for frictionally resisting and detenting pivotal movement of a vehicle seat accessory.

2. Description of Related Art

Many vehicular components, as well as elements in other fields, are mounted for selectively controlled pivotal movement. Increasingly, vehicles are being provided with seat accessories such as movable armrests and covered storage compartments centrally located between the front seats and, often, between the rear seats. It is desirable to have the armrests and compartment covers remain in the up/down or open/closed positions and to provide a degree of frictional resistance to movement between those positions. Previously, frictional forces have generally been provided by a relatively tight frictional engagement between opposing washers or the like, along the pivot pin, axle, etc. Further, provision of adjustment capabilities has often been provided by a mechanical, spring biased detent structure. However, all of these arrangements require the manufacture and assembly of a multiple of parts which, in turn, causes an increase in fabrication costs. Also, with extended use, these systems tend to loosen and wear.

SUMMARY OF THE INVENTION

The present invention concerns a friction detent apparatus for use with a device pivotally mounted on a pivot rod attached to a support structure. The apparatus includes a resistance washer having a generally planar circular body with a central portion fixedly mounted to a pivot rod attached to a support structure, the resistance washer body having a first generally arcuate friction contact surface spaced a first predetermined distance from the central portion and a second generally arcuate friction contact surface spaced a second predetermined distance from the central portion, the second predetermined distance being greater than the first predetermined distance. A first detent nub is formed on the first friction contact surface and a second detent nub is formed on the second friction contact surface. A first follower pin is fixedly mounted on the device pivotally mounted on the pivot rod for engaging the first friction contact surface and a second follower pin is fixedly mounted on the device for engaging the second friction contact surface. The first and second follower pins move along the first and second friction contact surfaces respectively as the device is rotated relative to the pivot rod and the first and second detent nubs releasably retain the first and second follower pins respectively in an "end of travel" position along the first and second friction contact surfaces.

In a tension beam embodiment, the resistance washer body has an elongated arcuate slot formed therein with the first friction contact surface being an outermost edge or side of the slot. A portion of the resistance washer body between the first friction contact surface and a periphery of the body is deflected outwardly under tension as the first follower pin moves past the first detent nub. In a compression beam embodiment, the first friction contact surface is formed as a radially recessed portion of a periphery of the resistance washer body. The body has an arcuate slot formed therein between the first detent nub and the central portion and a portion of the body between the first friction contact surface and the slot is deflected inwardly under compression as the first follower pin moves past the first detent nub. In both embodiments, the second friction contact surface is formed on the periphery of the resistance washer body, the body has an arcuate slot formed therein between the second detent nub and the central portion and a portion of the resistance washer body between the second friction contact surface and the slot is deflected inwardly under compression as the second follower pin moves past the second detent nub.

The apparatus includes a stop adapted fixedly mounted to the pivot rod and having a first radially extending finger for engaging the first follower pin at said "end of travel" position and a second radially extending finger for engaging the second follower pin at the "end of travel" position. The resistance washer body is attached to the stop. The apparatus includes another detent nub formed on the first friction contact surface for releasably retaining the first follower pin in another "end of travel" position along the first friction contact surface.

The compression beam resistance washer varies from prior art designs inter alia, in that it places the resistance beam in compression instead of tension. Thus, it is an object of the present invention to achieve desired resistance forces while providing a more durable product. This increased durability is the result of a decrease in creep as a result of the beam configuration and kinematics.

The previously known "tension" type beams have a tendency to exhibit wear and loss of resistance after fewer cycles are applied as compared to a compression beam. It is a further object of the present invention to provide greater initial resistance forces maintained over a longer cycle life. An outer/follower resistance feature reduces or eliminates the effects of production variation.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is an enlarged perspective view of the mounting assembly and the friction detent apparatus shown in the FIG. 2;

FIG. 4 is a left side elevation view of the resistance washer shown in the FIG. 3;

FIG. 5 is an enlarged perspective view similar to the FIG. 3 showing an alternate embodiment of the friction detent apparatus according to the present invention; and FIG. 6 is a left side elevation view of the resistance washer shown in the FIG. 5.

DESCRIPTION OF THE PREFERRED EMBODIMENT

Figure 1:
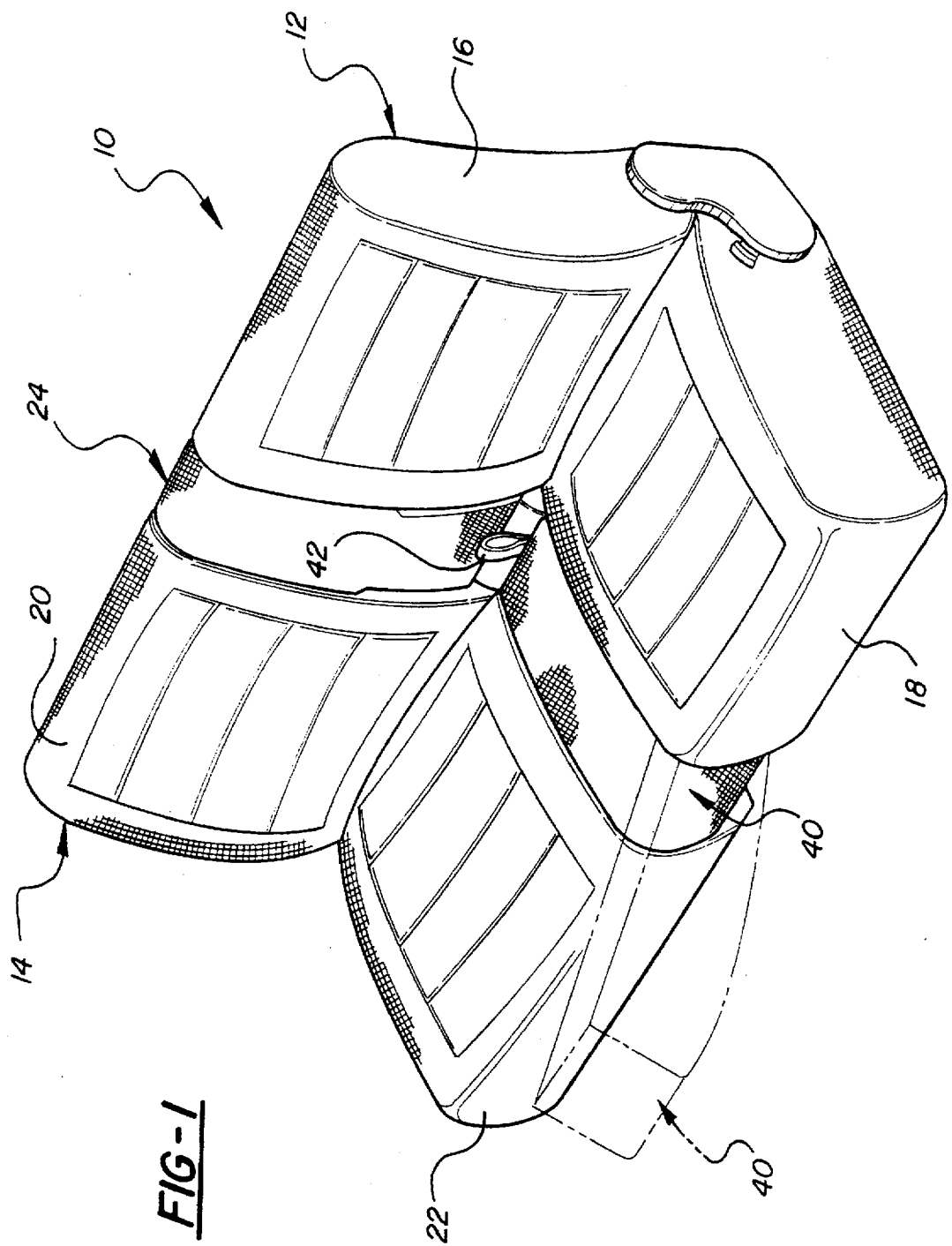
FIG. 1 is a perspective view of a vehicle seat assembly including seat accessory incorporating a friction detent apparatus according to the present invention.

Referring to the Figures, wherein like numerals indicate like or corresponding parts throughout the several views, there is shown in FIG. 1 a vehicle seat assembly 10 including a left hand seat 12 and a right hand seat 14. The left hand seat 12 has a left hand seat back 16 attached to a left hand seat bottom 18 which is typically mounted on a vehicle floor (not shown). Similarly, the right hand seat 14 has a right hand seat back 20 attached to a right hand seat bottom 22 which is typically mounted on the vehicle floor. The seats 12 and 14 are spaced apart by a seat accessory 24 which also is typically mounted on the vehicle floor.

Figure 2:
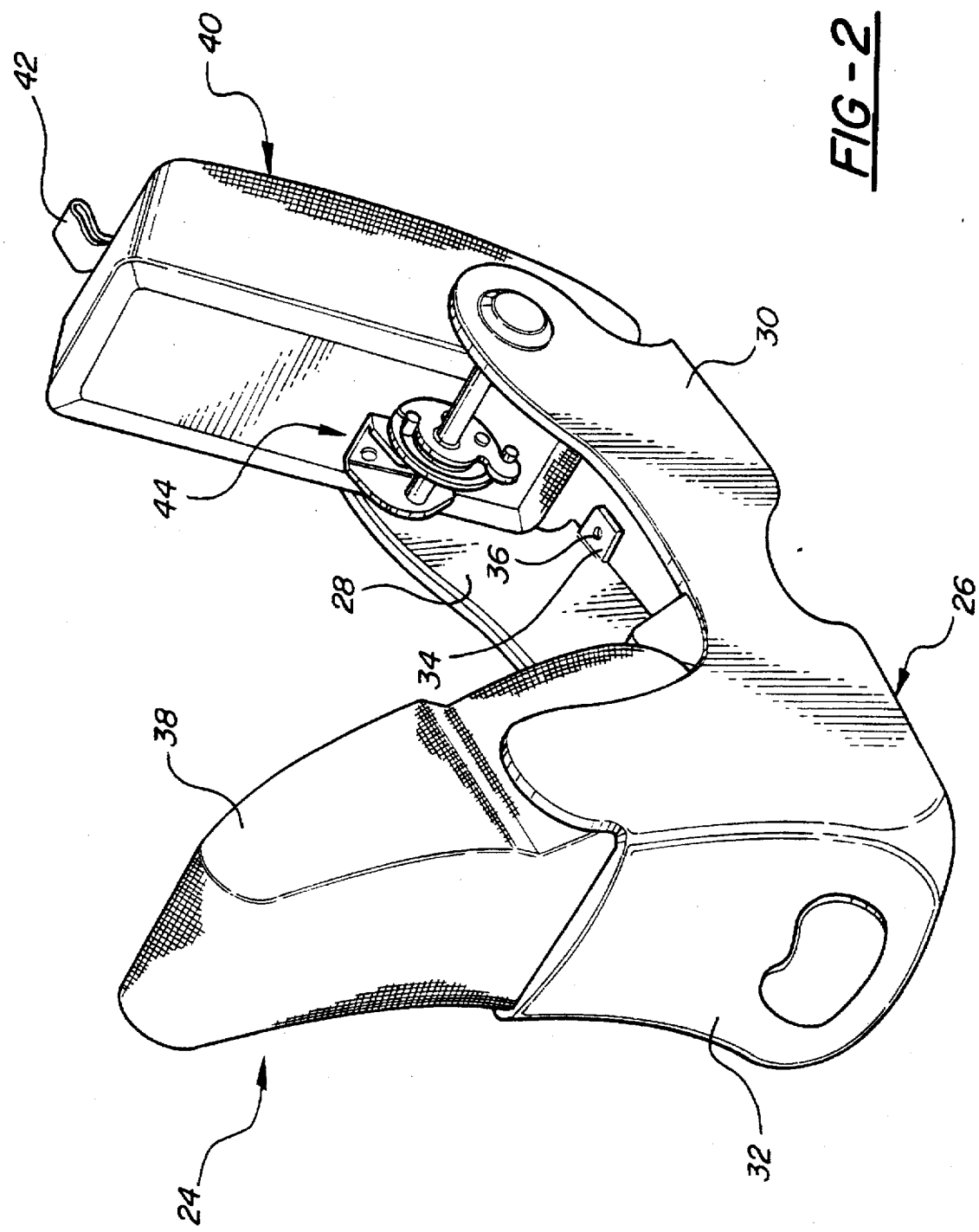
FIG. 2 is perspective view of the seat accessory shown in the FIG. 1 with a feature tray cover raised to show the friction detent apparatus according to the present invention.

As shown in the FIG. 2, the seat accessory 24 includes a support structure in the form of a seat accessory base 26. The seat accessory base 26 is constructed of a pair of sidewalls 28 and 30 and a rear wall 32. The left hand sidewall 28 extends in a generally vertical plane parallel to a generally vertical plane of the right hand sidewall 30. The sidewalls 28 and 30 are connected at rear edges thereof by the generally vertically extending rear wall 32 to form a three-sided support structure. The seat accessory 24 can be mounted to the vehicle floor (not shown) by any suitable means such as fasteners and mounting tabs. For example, a mounting tab 34 is shown as extending generally horizontally from a lower edge of the left sidewall 28 and having an aperture 36 formed therein for receiving a fastener (not shown). A rear portion of an armrest 38 is pivotally mounted to the sidewalls 28 and 30 adjacent the rear wall 32. The armrest 38 is shown in a generally vertically extending "up" position which locates it between the seat backs 16 and 20 as shown in the FIG. 1. Although not shown, the armrest 38 can be pivoted to a "down" position wherein it extends generally horizontally above the upper edges of the sidewalls 28 and 30.

The area between the sidewalls 28 and 30 can be used as a storage area. Although not shown, a feature tray can be positioned between the sidewalls 28 and 30 for receiving loose articles such as sunglasses, coins, a garage door opener, a cellular telephone, etc. Therefore, it is desirable to close this storage space to provide a degree of security for the stored articles. The feature tray space can be closed by a device such as a feature tray cover 40 shown in the "closed" position in the FIG. 1. The feature tray cover 40 is pivotally mounted on the sidewalls 28 and 30 near a front edge thereof for movement between the "closed" position and an "open" position shown in phantom in the FIG. 1 and in solid line in the FIG. 2. A loop or strap 42 can be attached to a rear portion of the feature tray cover 40 to assist an occupant of the vehicle in moving the feature tray cover from the "closed" position to the "open" position. The feature tray cover 40 is pivotally attached to the sidewalls 28 and 30 by a mounting assembly 44 shown in more detail in the FIG. 3.

There is shown in the FIG. 3 a portion of a first support bracket 46 which is attached to the sidewall 28 and a portion of a second support bracket 48 which is attached to the sidewall 30. The mounting assembly 44 includes a pivot rod 50 which is fixedly attached at opposite ends thereof to the brackets 46 and 48. Fixedly attached to a central portion of the pivot rod 50 is a stop 52 having a central aperture formed therein for receiving the pivot rod. The stop 52 includes a first finger 54 radially extending from the pivot rod a first predetermined distance. A second finger 56 is formed on the stop 52 generally diametrically from the first finger 54 and extends in a radial direction from the pivot rod 50 a second predetermined distance which is greater than the first predetermined distance. Attached to the stop 52 is a generally circular resistance washer 58 which is shown in more detail in the FIG. 4. The mounting assembly 44 further includes a bracket assembly 60 for pivotally mounting the feature tray cover 40 on the seat accessory base 26. The bracket assembly 60 includes a first cover mounting bracket 62 attached to an inner surface of the feature tray cover 40. The first bracket 62 has a first upstanding leg 64a and a spaced apart second upstanding leg 64b. The first leg 64a is positioned adjacent the first support bracket 46 and has an aperture formed therein for pivotally receiving the pivot rod 50. The bracket assembly 60 includes a second cover mounting bracket 66 which also is attached to the inside surface of the feature tray cover 40. The second bracket 66 is positioned adjacent the second support bracket 48 and has an aperture formed therein for pivotally receiving the pivot rod 50. Thus, the mounting brackets 62 and 66 are free to rotate about a longitudinal axis of the pivot rod 50 thereby permitting the feature tray cover 40 to be pivoted between the "open" and the "closed" positions.

The second leg 64b extends toward but does not contact a central portion of the pivot rod 50. Extending from the second leg 64b toward the second bracket 66 are a first follower pin 68 and a second follower pin 70. The first follower pin 68 extends generally parallel to the longitudinal axis of the pivot rod 50 and is spaced from the pivot rod the first predetermined distance for abutting the first finger 54 in the position shown. The second follower pin 70 also extends generally parallel to the longitudinal axis of the pivot rod 50 and is spaced therefrom at the second predetermined distance to abuttingly engage the second finger 56.

The resistance washer 58 is shown in more detail in FIG. 4 as having a generally planar circular body 72. An aperture 72a is formed in a central portion of the body 72 for receiving the pivot rod 50. A pair of posts 72b extend from the body 72 and are received by a corresponding pair of apertures formed in the stop 52 for attaching the washer 58 to the stop. The posts 72b can be staked or otherwise deformed (FIG. 3) to fix the resistance washer 58 in place. An elongated arcuate slot 72c is formed in the body 72 adjacent a periphery 74 thereof. The first follower pin 68 is aligned with and extends through the elongated arcuate slot 72c. The pin 68 is dimensioned to frictionally engage opposite sides 72d of the slot 72c. Thus, as the feature tray cover 40 is rotated about the pivot rod 50 to open and close, the first follower pin 68 will be moved in the directions of arrows 76 and frictional contact between the follower pin and contact surfaces of the sides 72d of the slot 72c will provide some resistance to this rotation. A pair of detent nubs 78 are formed in the sides 72d of the slot 72c adjacent opposite ends 72e and 72f of the slot. The detent nubs 78 provide a positive releasable locking of the first follower pin 68 at each end 72e and 72f of the slot 72c to retain the feature tray cover 40 in the "open" and "closed" positions. At the end 72f, the pin 68 contacts the first finger 54 and at the end 72e, contacts the second finger 56.

The second follower pin 70 frictionally engages a contact portion of the periphery 74 of the body 72. Rotation of the feature tray cover 40 causes the second follower pin 70 to be moved in the directions of arrows 80. A third detent nub 82 is formed on the periphery 74 adjacent the end 72e of the slot 72c. When the feature tray cover 40 is rotated to the "closed" position, the second follower pin 70 rides over the third detent nub 82 to provide a locking function. Therefore, it is necessary to exert additional force to initiate movement of the feature tray cover 40 from the "closed" position in order to force the pin 70 back over the detent nub 82. A relatively short arcuate slot 84 is formed in the body 72 of the resistance washer 58 adjacent the third detent nub 82 to permit the periphery 74 and the third detent nub to deform sufficiently to allow the second follower pin 70 to pass. The portion of the body 72 between the side 72d and the periphery 74 deforms in a similar manner when the pin 68 passes the detent nubs 78.

There is shown in the FIG. 5 and the FIG. 6 an alternate embodiment resistance washer 100 which is attached to the stop 52 in place of the resistance washer 58. The resistance washer 100 has a generally planar circular body 102. An aperture 102a is formed in a central portion of the body 102 for receiving the pivot rod 50. A smaller diameter aperture 102b is formed in the body 102 for receiving a fastener 102c received by a corresponding aperture formed in the stop 52 for attaching the washer 100 to the stop. Alternatively, one or more of the posts 72b (FIG. 4) can be used fix the resistance washer 100 in place. A portion of a periphery 104 of the body 102 is radially recessed to form a contact surface 102d for engaging the first follower pin 68. Thus, as the feature tray cover 40 is rotated about the pivot rod 50 to open and close, the first follower pin 68 will be moved in the directions of arrow 76 and frictional contact between the follower pin and the contact surface 102d will provide some resistance to this rotation. A pair of detent nubs 106 are formed at opposite sides of ends 102e and 102f of the contact surface 102d. The detent nubs 106 provide a positive releasable locking of the first follower pin 68 at each end 102e and 102f to retain the feature tray cover 40 in the "open" and "closed" positions. At the end 102f, the pin 68 contacts the first finger 54 and at the end 102e, contacts the second finger 56.

Rotation of the feature tray cover 40 on the pivot rod 50 also rotates the second follower pin 70 in the directions of the arrow 80. However, in order to move from the position shown, the second follower pin 70 must pass by a third detent nub or ramp 108 formed in the periphery 104 adjacent the end 102e. An arcuate slot 110 is formed in the body 102 adjacent the detent nub 108 to permit the periphery 104 of the resistance washer 100 to deflect when the second follower pin 70 passes that point. A pair of similar arcuate slots 112 are formed in the body 102 adjacent the ends 102e and 102f to permit the contact surface 102d to deform when the first follower pin 68 passes the detent nubs 106.

The resistance washers 58 and 100 are formed of a resilient material such as a plastic material. In the washer 100, those portions of the body 102 adjacent the slots 110 and 112 function as compression beams. Thus, the compression beam resistance washer 100 described above allows an adjacent, but separate, component to move rotationally with respect to the washer, and to be captured at the two "end of travel" positions. The pins 68 and 70 function as the component to be captured. At the "end of travel" positions, the detent nubs 106 are provided as an obstacle to overcome in order to disengage the pins. Utilizing a slight interference between the detent 108 and the second pin 70, the washer is able to nest the first pin 68 further into the "closed end of travel" position and reduce or eliminate "chucking" caused by normal production variation. To disengage the pins and move out of the "closed end of travel" position, a rotational motion about the pivot pin 50 is required. As the motion begins, the detents cause an interference to the pins that can only be overcome by deflecting the adjacent beams toward the center of the washer body. This deflection process provides the resistance force that captures the pins at the "end of travel" position. As the rotational motion continues, the pins 68 and 70 travel beyond the detent nubs to portions of the contact surfaces which are at distances from the longitudinal axis of the pivot pin 50 to return the adjacent slots to the uncompressed shapes.

Creep is a permanent set or plastic deformation caused by the application of stress, and can be both time and temperature dependent. The compression beam concept allows for a change in overcoming resistance force simply by varying the distance between the pivot point and detent nubs (i.e., an increase in distance will yield a higher resistance).

Additionally, varying the areas of the slots 110 and 112 will effect the resistance (i.e., a larger area will yield greater flex and a lower resistance). If the washer 100 is constructed from a thermal plastic material, wear is typically a concern to the conventional tension beam concepts, specifically at the detent nubs. Allowing the beams to deflect away from the pins significantly reduces the wear (as compared to tension beams) at these points by minimizing or eliminating the possibility of creep of the material. This reduction of wear provides a more durable component by lengthening the useful cycle life, i.e., maintains the initial resistance force longer.

The resistance washer 58 functions on a tension beam concept to allow an adjacent, but separate, component to move rotationally with respect to the washer, and be captured at the "end of travel" positions. As with the compression beam design, detents 78 and 80 provide a stop that retains the pins within the "closed end of travel" position. The anti-chuck feature also can be incorporated into the tension beam construction by causing a slight interference between the second pin 70 and the detent nub 82 which nests the first pin 68 further into the "end of travel" position to reduce or eliminate the effects of normal production variation. To disengage the pins from the "closed end of travel" position, a rotational motion causes the pins to move and they must overcome the two stops created by the detent nubs 78 and 80. The first pin 68 creates an interference with the beam material between the slot 72c and the periphery 74 that causes the beam to deflect and "stretch", thus placing it under a tension load. The disadvantage of this system is that the beam is unable to "stretch" sufficiently enough to provide a large overcoming force without causing the material adjacent the detent nub 78 to creep. In order to increase the resistance force, the detent nub 78 must be moved closer to the pivot point at the pivot rod 50 in order to create a greater interference to the first pin 68. As this interference grows, the amount of stress increases and, in turn, increases the amount of creep experienced in the body 72. The increased creep results in a shorter life cycle expectancy, and therefore a less durable component. The second pin 70 and detent nub 80 react very similarly to the first pin 68 and the detent nub 78 with respect to creep, when the compression beam design is not utilized. Because the material has no means of deflecting away from the pin, the material creeps under the stress.

Because the tension beam resistance washer 58 does not allow for an equivalent amount of flex with respect to the compression beam resistance washer 100, the material undergoes more creep and results in a less durable product. It is also difficult to obtain the same initial resistance forces over an extended cycle life. Finally, the tension beam resistance washer 58 typically exhibits a tendency to fracture as a result of the continuous "stretching" and high stress which is placed upon the detent nub 78 during the disengaging process. However, the tension beam resistance washer 58 may be suitable for use with light weight covers requiring little resistance and holding force.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A friction detent apparatus for use with a device pivotally mounted on a pivot rod attached to a support structure comprising: a resistance washer having a generally planar circular body with a central portion adapted to be fixedly mounted on a pivot rod attached to a support structure, said resistance washer body having a first generally arcuate friction contact surface spaced a first predetermined distance from said central portion and a second generally arcuate friction contact surface spaced a second predetermined distance from said central portion, said second predetermined distance being greater than said first predetermined distance, a first detent nub formed on said first friction contact surface and a second detent nub formed on said second friction contact surface; a first follower pin adapted to be fixedly mounted on a device pivotally mounted on the pivot rod for engaging said first friction contact surface; and a second follower pin adapted to be fixedly mounted on the device for engaging said second friction contact surface whereby said first and second follower pins move along said first and second friction contact surfaces respectively as the device is rotated relative to the pivot rod and said first and second detent nubs releasably retain said first and second follower pins respectively in an "end of travel" position along said first and second friction contact surfaces.

2. The apparatus according to claim 1 wherein said resistance washer body has an elongated arcuate slot formed therein, said first friction contact surface being a side of said slot.

3. The apparatus according to claim 2 wherein a portion of said resistance washer body between said first friction contact surface and a periphery of said resistance washer body is deflected outwardly under tension as said first follower pin moves past said first detent nub.

4. The apparatus according to claim 1 wherein said first friction contact surface is formed as a radially recessed portion of a periphery of said resistance washer body.

5. The apparatus according to claim 4 wherein said resistance washer body has an arcuate slot formed therein between said first detent nub and said central portion and a portion of said resistance washer body between said first friction contact surface and said slot is deflected inwardly under compression as said first follower pin moves past said first detent nub.

6. The apparatus according to claim 1 wherein said second friction contact surface is formed on a periphery of said resistance washer body.

7. The apparatus according to claim 6 wherein said resistance washer body has an arcuate slot formed therein between said second detent nub and said central portion and a portion of said resistance washer body between said second friction contact surface and said slot is deflected inwardly under compression as said second follower pin moves past said second detent nub.

8. The apparatus according to claim 1 including a stop adapted to be fixedly mounted to the pivot rod, said stop having a first radially extending finger for engaging said first follower pin at said "end of travel" position.

9. The apparatus according to claim 8 wherein said stop has a second radially extending finger for engaging said second follower pin at said "end of travel" position.

10. The apparatus according to claim 8 wherein said resistance washer body is attached to said stop.

11. The apparatus according to claim 1 including another detent nub formed on said first friction contact surface for releasably retaining said first follower pin in another "end of travel" position along said first friction contact surface.

12. A mounting assembly for pivotally mounting a cover on a support base comprising: a pivot rod adapted to be fixedly attached to a support base; a cover mounting bracket pivotally mounted on said pivot rod and adapted to be fixedly attached to a cover for the support base; a resistance washer having a generally planar circular body with a central portion fixedly mounted on said pivot rod and having a first generally arcuate friction contact surface spaced a first predetermined distance from said central portion and a second generally arcuate friction contact surface spaced a second predetermined distance from said central portion, said second predetermined distance being greater than said first predetermined distance, a first detent nub formed on said first friction contact surface and a second detent nub formed on said second friction contact surface; a first follower pin fixedly mounted on said cover mounting bracket for engaging said first friction contact surface; and a second follower pin fixedly mounted on said cover mounting bracket for engaging said second friction contact surface whereby said first and second follower pins move along said first and second friction contact surfaces respectively as the cover is rotated relative to said pivot rod, said first and second detent nubs releasably retain said first and second follower pins respectively in an "end of travel" position along said first and second friction contact surfaces and portions of said resistance washer body adjacent said first and second detent nubs are deflected by said first and second follower pins respectively during movement of said first and second follower pins past said first and second detent nubs respectively.

13. The apparatus according to claim 12 including a stop attached to said resistance washer body and having a first finger spaced said first predetermined distance from said central portion for engaging said first follower pin and a second finger spaced said second predetermined distance from said central portion for engaging said first and second follower pins.

14. The apparatus according to claim 12 wherein said resistance washer body has an elongated arcuate slot formed therein, said first friction contact surface being a side of said slot.

15. The apparatus according to claim 14 wherein a portion of said resistance washer body between said first friction contact surface and a periphery of said resistance washer body is deflected outwardly under tension as said first follower pin moves past said first detent nub.

16. The apparatus according to claim 12 wherein said first friction contact surface is formed as a radially recessed portion of a periphery of said resistance washer body.

17. The apparatus according to claim 16 wherein said resistance washer body has an arcuate slot formed therein between said first detent nub and said central portion and a portion of said resistance washer body between said first friction contact surface and said slot is deflected inwardly under compression as said first follower pin moves past said first detent nub.

18. The apparatus according to claim 12 wherein said second friction contact surface is formed on a periphery of said resistance washer body.

19. The apparatus according to claim 18 wherein said resistance washer body has an arcuate slot formed therein between said second detent nub and said central portion and a portion of said resistance washer body between said second friction contact surface and said slot is deflected inwardly under compression as said second follower pin moves past said second detent nub.

20. A seat accessory comprising: a seat accessory base adapted to be fixedly attached to a vehicle interior; a pivot rod fixedly attached to said seat accessory base; a feature tray cover; a cover mounting bracket pivotally mounted on said pivot rod and fixedly attached to said feature tray cover for permitting pivotal movement of said feature tray cover relative to said pivot rod between an open position and a closed position; a resistance washer having a generally planar circular body with a central portion fixedly mounted on said pivot rod and having a first generally arcuate friction contact surface spaced a first predetermined distance from said central portion and a second generally arcuate friction contact surface spaced a second predetermined distance from said central portion, said second predetermined distance being greater than said first predetermined distance, a first detent nub formed on said first friction contact surface and a second detent nub formed on said second friction contact surface; a stop attached to said resistance washer body and having a first finger spaced said first predetermined distance from said central portion and a second finger spaced said second predetermined distance frown said central portion; a first follower pin fixedly mounted on said cover mounting bracket for engaging said first friction contact surface; and a second follower pin fixedly mounted on said cover mounting bracket for engaging said second friction contact surface whereby said first and second follower pins move along said first and second friction contact surfaces respectively as the feature tray cover is rotated relative to said pivot rod and said first and second detent nubs releasably retain said first and second follower pins respectively in an "end of travel" position along said first and second friction contact surfaces.

* * * * *